(12) United States Patent
Park et al.

(10) Patent No.: US 10,306,178 B2
(45) Date of Patent: May 28, 2019

(54) DISPLAY APPARATUS

(71) Applicant: LG Display Co., Ltd., Seoul (KR)

(72) Inventors: Sang Ryeon Park, Gumi-si (KR); Ho Young Jung, Paju-si (KR); Kwan Seob Byun, Gumi-si (KR); Sung Yong Park, Gyeongsangbuk-do (KR); Ik Hyun Kuon, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 148 days.

(21) Appl. No.: 14/105,827

(22) Filed: Dec. 13, 2013

(65) Prior Publication Data

US 2014/0293518 A1 Oct. 2, 2014

(30) Foreign Application Priority Data

Mar. 29, 2013 (KR) .................. 10-2013-0034488

(51) Int. Cl.
*H05K 7/00* (2006.01)
*H04N 5/64* (2006.01)
*H05K 5/02* (2006.01)
*F21V 8/00* (2006.01)

(52) U.S. Cl.
CPC ............. *H04N 5/64* (2013.01); *G02B 6/0088* (2013.01); *H05K 5/02* (2013.01)

(58) Field of Classification Search
CPC ........... H04N 5/64; G02B 6/0088; H05K 5/02
USPC .................................................. 361/679.24
See application file for complete search history.

(56) References Cited

U.S. PATENT DOCUMENTS

| 7,567,316 B2 * | 7/2009 | Hu ..................... G02B 6/0088 349/56 |
| 7,758,231 B2 * | 7/2010 | Kang ................. G02B 6/0088 349/58 |
| 2001/0006461 A1 * | 7/2001 | Okuno ............... G02B 6/0088 362/311.06 |
| 2005/0200264 A1 * | 9/2005 | Kawanami ............. H01J 11/10 313/479 |
| 2009/0033827 A1 * | 2/2009 | Chen .................. G02B 6/0088 349/58 |
| 2011/0103041 A1 * | 5/2011 | Mathew ............... G06F 1/1616 362/97.3 |
| 2011/0199556 A1 * | 8/2011 | Oohira ............. G02F 1/133308 349/62 |
| 2011/0261282 A1 | 10/2011 | Jean et al. |
| 2011/0291983 A1 * | 12/2011 | Yao ....................... G06F 3/041 345/174 |
| 2012/0057368 A1 * | 3/2012 | Kuo .................... G02B 6/0068 362/609 |

(Continued)

*Primary Examiner* — Rockshana D Chowdhury
(74) *Attorney, Agent, or Firm* — Fenwick & West LLP

(57) ABSTRACT

Disclosed is a display apparatus that seals a gap space between a display panel and a cover sidewall by an upper optical film attached to an upper surface of the display panel, wherein the display apparatus may include a rear cover with a space; a guide frame received in the space; a display panel supported by the guide frame; a panel connection member for connecting the display panel with the guide frame; and the upper optical film, wherein the cover sidewall covers side surfaces of the display panel and the upper optical film, and an end of the upper optical film is inserted into an optical film insertion groove formed in an inner surface of the cover sidewall so as to cover and seal the gap space between the display panel and the cover sidewall.

22 Claims, 9 Drawing Sheets

(56) References Cited

U.S. PATENT DOCUMENTS

2012/0194761 A1* 8/2012 Nakano ............ G02F 1/133308
                                                                         349/58
2013/0044269 A1* 2/2013 Cho ................ G02F 1/133308
                                                                         349/58

* cited by examiner

DISPLAY APPARATUS

CROSS REFERENCE TO RELATED APPLICATIONS

This application claims the benefit of Korean Patent Application No. 10-2013-0034488 filed on Mar. 29, 2013, which is hereby incorporated by reference as if fully set forth herein.

BACKGROUND OF THE INVENTION

Field of the Invention

Embodiments of the present invention relate to a display apparatus, and more particularly, to a display apparatus with an improved exterior design.

Discussion of the Related Art

Various display devices, which substitute for Cathode Ray Tubes (CRT) manufactured in an early stage of display devices, have been researched and studied, for example, liquid crystal display device, plasma display panel, organic light emitting diode display device, etc. These display devices achieve large sizes by decreasing weight and volume. Also, these display devices have been highly developed in various aspects such as response speed and picture quality through the continuous study. In addition to the research and development in technical aspects, design aspects of a product that can appeal to consumers have been actively researched and studied. Especially, in case of the display device which includes a display panel for displaying images thereon, and a bezel for covering an edge of the display panel, efforts to minimize a width of the bezel have been made so as to keep up with the recent design trend.

Meanwhile, the Unexamined Publication Number P10-2011-0119360 in the Korean Intellectual Property Office, proposed by the applicant for this patent, discloses a display apparatus which obtains a minimized thickness by removing the above-mentioned bezel, and furthermore realizes a good appearance in a design aspect. In detail, as shown in FIGS. 1A and 1B, the display apparatus of Korean Patent Publication No. P10-2011-0119360 improves the exterior design by removing the bezel in a method for connecting a display panel 2 and a guide frame 3 by the use of connection member 1 using an adhesive such as double-sided tape, and seals a gap space (GS) between each side of the display panel 2 and a sidewall 4 of a set cover by the use of sealing member 5 having head and seam or having a film structure, to thereby prevent foreign matters from penetrating into the inside through the gap space (GS).

However, the display apparatus of Korean Patent Publication No. P10-2011-0119360 may have the following disadvantages.

First, the sealing member 5 is inevitably provided so as to seal the gap space (GS) between each side of the display panel 2 and the sidewall 4 of the set cover.

Also, when the sealing member 5 having head and seam is connected to the gap space (GS), cracks might occur in the display panel 2 due to a pressure applied to the display panel 2.

Furthermore, when the gap space (GS) is sealed by the use of sealing member 5 using the film structure, it is difficult to attach the film structure to the display panel 2 and the sidewall 4 of the set cover.

SUMMARY OF THE INVENTION

Accordingly, embodiments of the present invention are directed to a display apparatus that substantially obviates one or more problems due to limitations and disadvantages of the related art.

An aspect of embodiments of the present invention is to provide a display apparatus that seals a gap space (GS) between a display panel and a cover sidewall of a rear cover by the use of upper optical film attached to an upper surface of the display panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display apparatus that may include a rear cover with a space prepared by a cover plate and a cover sidewall; a guide frame received in the space; a display panel supported by the guide frame; a panel connection member for connecting the display panel with the guide frame; and an upper optical film attached to an upper surface of the display panel, wherein the cover sidewall covers side surfaces of the display panel and the upper optical film, and an end of the upper optical film is inserted into an optical film insertion groove formed in an inner surface of the cover sidewall so as to cover and seal a gap space between the display panel and the cover sidewall.

The upper optical film may include an attaching portion attached to the upper surface of the display panel and an extending portion extending from the attaching portion and inserted into the optical film insertion groove.

Also, the rear cover may further include a pushing guide provided with a predetermined inclination in order to guide the extending portion to be inserted into the optical film insertion groove, wherein the pushing guide is formed on an upper surface of the cover sidewall overlapped with the extending portion of the upper optical film.

In addition, the rear cover may further include a slope provided with a predetermined inclination on an upper surface of the optical film insertion groove being in contact with the extending portion of the upper optical film.

The extending portion of the upper optical film inserted into the optical film insertion groove may be bent in accordance with the inclination of the slope, and then adhered to the slope.

Also, the upper optical film may further include a stepped portion formed in the edge of the extending portion overlapped with the optical film insertion groove, onto which the upper surface of the cover sidewall is placed, wherein the upper surface of the upper optical film may be positioned in the same plane with the upper surface of the cover sidewall.

In another aspect, the upper optical film may include a polarizing film; a lower protection film attached to a lower surface of the polarizing film; an adhesive layer formed on a lower surface of the lower protection film; and an upper protection film attached to an upper surface of the polarizing film, wherein the stepped portion is formed by removing the edge of the upper protection film overlapped with the optical film insertion groove, or by removing the edges of the polarizing film and upper protection film overlapped with the optical film insertion groove.

In another aspect, the upper optical film may include an upper polarizing film attached to the upper surface of the display panel; and a pattern retarder film attached to an upper surface of the upper polarizing film, wherein each edge of the upper polarizing film and pattern retarder film is inserted into the optical film insertion groove.

In another aspect, the upper optical film may include an upper polarizing film attached to an upper surface of the display panel; and a pattern retarder film attached to an upper surface of the upper polarizing film, wherein an end of the upper polarizing film is inserted into the optical film insertion groove, and an upper surface of the pattern retarder film is positioned in the same plane as an upper surface of the cover sidewall.

Furthermore, the display apparatus may further include a light-shielding member for preventing light from leaking in the respective sides of the display panel through the gap space, wherein the light-shielding member may be formed on a lower surface of the upper optical film overlapped with the gap space.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

On explanation about the embodiments of the present invention, the following details about the terms should be understood.

The term of a singular expression should be understood to include a multiple expression as well as the singular expression if there is no specific definition in the context. If using the term such as "the first" or "the second", it is to separate any one element from other elements. Thus, a scope of claims is not limited by these terms.

Also, it should be understood that the term such as "include" or "have" does not preclude existence or possibility of one or more features, numbers, steps, operations, elements, parts or their combinations.

It should be understood that the term "at least one" includes all combinations related with any one item. For example, "at least one among a first element, a second element and a third element" may include all combinations of the two or more elements selected from the first, second and third elements as well as each element of the first, second and third elements.

Also, if it is mentioned that a first element is positioned "on or above" a second structure, it should be understood that the first and second elements may be brought into contact with each other, or a third element may be interposed between the first and second elements. However, if using "right on or right above", it should be understood that the first and second elements are brought into contact with each other.

Hereinafter, a display apparatus according to the present invention will be described with reference to the accompanying drawings.

Figure 1A:
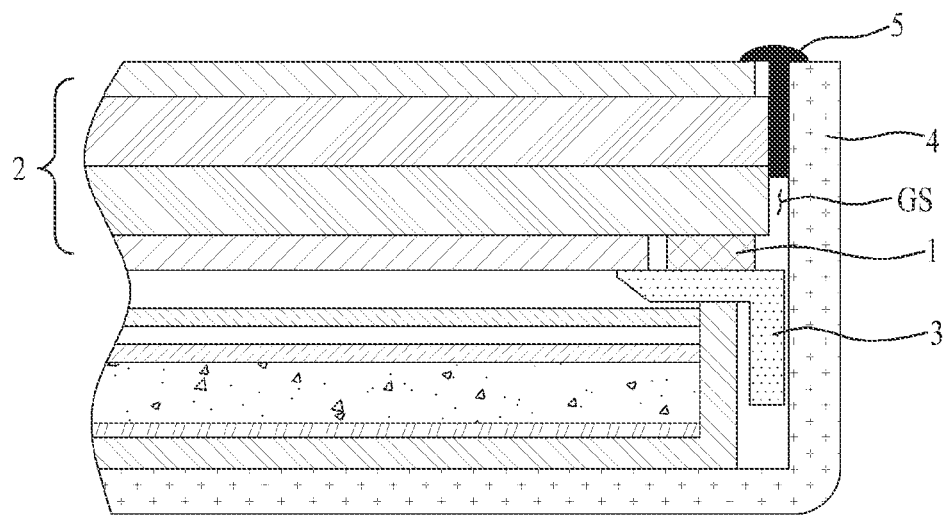
FIGS. 1A and 1B are cross sectional views illustrating a related art display apparatus.
Figure 1B:
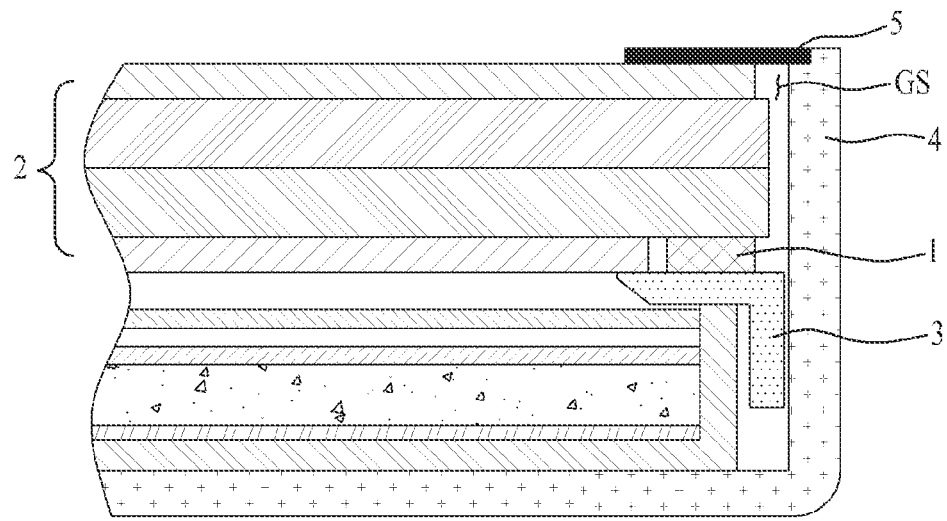
Figure 2:
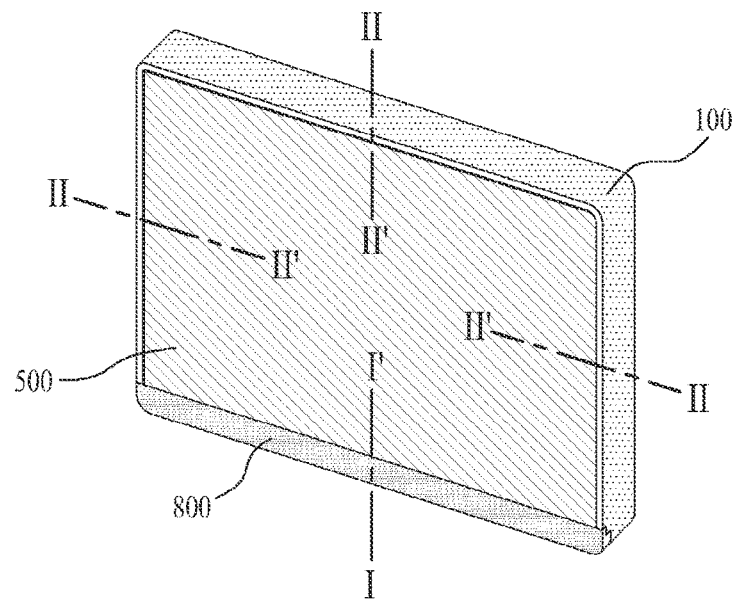
FIG. 2 illustrates a display apparatus according to a first embodiment of the present invention.
Figure 3:
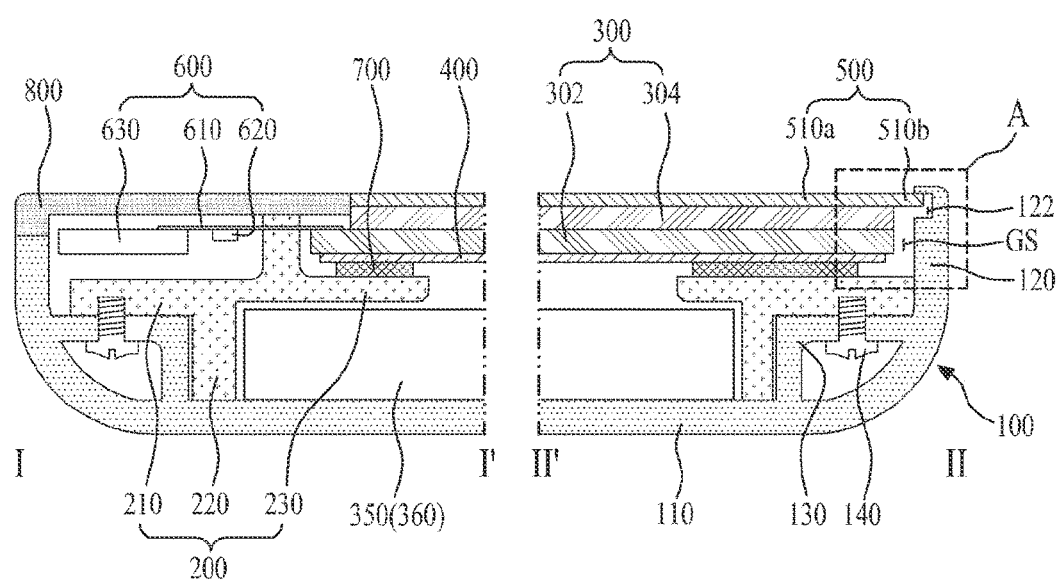
FIG. 3 is a cross sectional view along I-I' and II-II' of FIG. 2.
Figure 4:
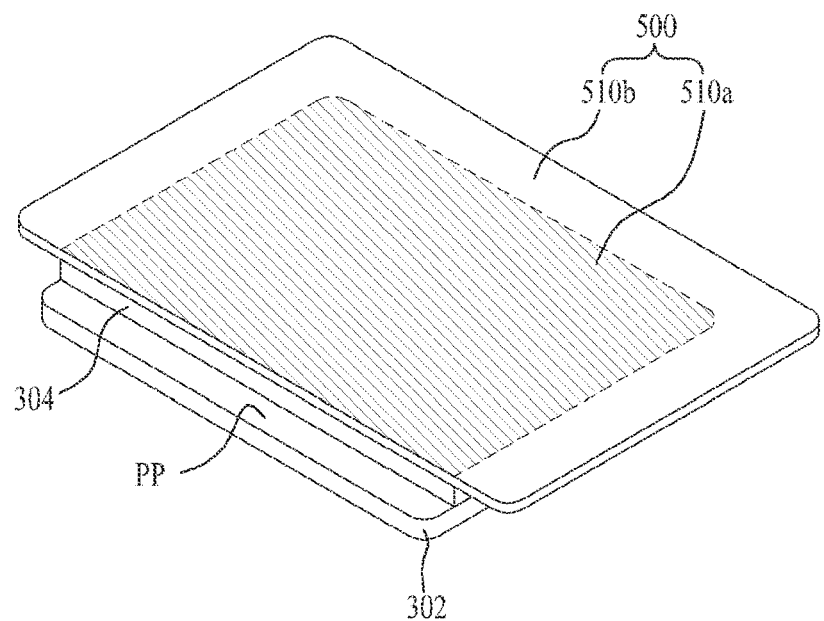
FIG. 4 illustrates a display panel and an upper optical film shown in FIG. 3.

FIG. 2 illustrates a display apparatus according to a first embodiment of the present invention. FIG. 3 is a cross sectional view along I-I' and II-II' of FIG. 2. FIG. 4 illustrates a display panel and an upper optical film of FIG. 3.

Referring to FIGS. 2 to 4, the display apparatus according the first embodiment of the present invention may include a rear cover 100, a guide frame 200, a display panel 300, a lower optical film 400, an upper optical film 500, a panel driver 600, a panel connection member 700, and a circuit cover 800.

The rear cover 100, which is positioned in the outermost region of the display apparatus, receives the guide frame 200 and the display panel 300 therein, and also covers the respective sides of the guide frame 200 and the display panel 300. To this end, the rear cover 100 may include a cover plate 110, a cover sidewall 120, and a frame supporter 130.

The cover plate 110 is positioned in the outermost rear region of the display apparatus, that is, the cover plate 110 forms a bottom surface of the rear cover 100. The cover plate 110 supports the guide frame 200.

The cover sidewall 120 is positioned in the outermost side region of the display apparatus, that is, the cover sidewall 120 forms a side surface of the rear cover 100. That is, the cover sidewall 120, which is vertically bent from an end of the cover plate 110, has a predetermined height so that the cover sidewall 120 functions as the side surface of the rear cover 100. In this case, each edge formed by the cover sidewall 120 and the cover plate 110 may be rounded with a predetermined curvature so as to improve exterior appearance of the display apparatus. Furthermore, each of four corners formed by the respective cover sidewalls 120 may be rounded with a predetermined curvature so as to improve exterior appearance of the display apparatus.

The cover sidewall 120 covers the respective sides of the guide frame 200 and the display panel 300. In this case, an upper surface of the cover sidewall 120 is higher than an upper surface of the display panel 300 so that it is possible to prevent the side surface of the display panel 300 from being exposed to the exterior of the display apparatus.

The cover sidewall 120 may include an optical film insertion groove 122. The optical film insertion groove 122 is formed in an inner side surface of the cover sidewall 120, and more particularly, the inner side surface adjacent to the side surfaces of the display panel 300 and the upper optical film 500. That is, when the optical film insertion groove 122 having a predetermined height and width is formed in the inner side surface of the cover sidewall 120, the optical film insertion groove 122 is positioned at a predetermined interval from the upper surface of the cover sidewall 120. The upper optical film 500 of the display panel 300 is inserted into the optical film insertion groove 122, which will be described later.

The frame supporter 130 is formed between the edge of the cover plate 110 and the inner side surface of the cover sidewall 120 adjacent to the edge of the cover plate 110, thereby supporting the guide frame 200. That is, the frame supporter 130 may include a vertical protruding portion which vertically protrudes from the bottom surface of the cover plate 110 adjacent to the cover sidewall 120, and a horizontal protruding portion which is connected from the vertical protruding portion to the inner side surface of the cover sidewall 120. In this case, each of the vertical and horizontal protruding portions, which has an "L"-shaped cross section, is exposed to the outside of the rear of the display apparatus.

The rear cover 100 may include a receiving space surrounded by the vertical protruding portion and prepared on the cover plate 110, and an insertion hole vertically penetrating through the horizontal protruding portion.

The guide frame 200 is received in the receiving space prepared by the rear cover 100, to thereby support the display panel 300. To this end, the guide frame 200 may include a cover connection portion 210, a guide sidewall 220, and a panel connection portion 230.

The cover connection portion 210 is formed in a rectangular-shaped band having a predetermined height and width, and is placed onto the frame supporter 130 of the rear cover 100. Also, a fastening hole of screw thread is formed in the cover connection portion 210 which is overlapped with the insertion hole formed in the frame supporter 130. Accordingly, the cover connection portion 210 is connected with and fixed to the frame supporter 130 by the use of fastening member 140 being inserted into the insertion hole from the rear of the rear cover 100 and then fastened into the fastening hole.

The guide sidewall 220 vertically protrudes from a lower surface of inner edge of the cover connection portion 210 toward the cover plate 110 of the rear cover 100. For example, the guide sidewall 220 may be formed in a rectangular-shaped band having a height and width, wherein the width may be smaller than the height. The guide sidewall 220 is received in the receiving space of the rear cover 100, to thereby support the cover connection portion 210.

The panel connection portion 230 having a predetermined width extends from the inner side surface of the cover connection portion 210. For example, the panel connection portion 230 may be formed in a rectangular-shaped band having predetermined height and width, wherein the width may be larger than the height. The panel connection portion 230 is connected with the edge of the display panel 300 by the use of panel connection member 700, to thereby support the display panel 300.

FIG. 3 shows that the guide frame 200 is connected with the rear cover 100 by the use of connection member 140, but not limited to this structure. The guide frame 200 and the rear cover 100 may be connected to each other by a hook fastening method. If applying the hook fastening method, a hook groove is formed in the outer side surface of the guide sidewall 220 of the guide frame 200, and a hook projection to be fastened with the hook groove is formed in the inner side surface of the cover sidewall 120 of the rear cover 100. Also, if the guide frame 200 and the rear cover 100 are fastened with each other by the hook fastening method, it is possible to omit the frame supporter 130 from the rear cover 100.

The display panel 300 is positioned in the front of the display apparatus, to thereby display images thereon. The display panel 300 may be a flat display panel such as a liquid crystal display panel, a plasma display panel or an organic light-emitting diode display panel. Hereinafter, it is assumed that the display panel 300 is a liquid crystal display panel.

The display panel 300 may include a first substrate 302 and a second substrate 304.

The first substrate 302 is a thin film transistor array substrate including a display area and a non-display area. In this case, each corner of the first substrate 302 may be rounded with a predetermined curvature so as to improve exterior appearance of the display apparatus.

On the display area of the first substrate 302, there are a plurality of pixels (not shown) which are respectively formed in pixel regions prepared by intersection of a plurality of gate lines (not shown) and a plurality of data lines (not shown). Each pixel may include a thin film transistor (not shown) connected with the gate and data lines, a pixel electrode connected with the thin film transistor (not shown), and a common electrode formed adjacent to the pixel electrode and supplied with a common voltage. According to a driving method of liquid crystal layer, the common electrode may be formed on the second substrate 304.

The non-display area of the first substrate 302 is defined in the margin of the display area, wherein a plurality of pad regions (PP) and a gate driving circuit (not shown) are formed on the non-display area of the first substrate 302.

Each of the pad regions (PP) is formed on the non-display area of a lower long side of the first substrate 302, wherein each of the pad regions (PP) includes a plurality of pads connected with the respective data lines of the display area.

The gate driving circuit may be formed in the non-display area of one short side or both short sides of the first substrate 302, and the gate driving circuit may be manufactured during a process for forming the thin film transistor in each pixel, wherein the gate driving circuit is connected with the respective gate lines of the display area. In this case, the gate driving circuit is connected with the plurality of gate pads included in the first and/or last pad region (PP) among the plurality of pad regions (PP). The gate driving circuit generates a gate (or scan) signal according to a gate control signal supplied to the plurality of gate pads from the panel driver 600, and supplies the generated gate signal to each gate line, wherein the gate driving circuit may be formed of a shift register for generating and outputting the gate signal.

The second substrate 304 is a color filter array substrate. An area of the second substrate 304 corresponds to an area overlapped with the first substrate 302 except the non-display area of the lower long side thereof, wherein the second substrate 304 may include a black matrix for defining an open area in each pixel formed on the first substrate 302, and a color filter formed in the open area. According to a driving method of a liquid crystal layer, the common electrode supplied with the common voltage may be formed on the second substrate 304.

Each corner of an upper long side of the second substrate 304 may be rounded with a predetermined curvature so as to improve exterior appearance of the display apparatus.

The first and second substrates 302 and 304 facing each other are bonded to each other by a substrate sealing member (not shown) for covering the remaining regions of the first substrate 302 except the pad regions (PP), to thereby manufacture the liquid crystal display panel. A detailed structure of the first and second substrates 302 and 304 may vary according to driving modes of a liquid crystal layer, that is, various modes generally known to those in the art, for example, Twisted Nematic (TN) mode, Vertical Alignment (VA) mode, In-Plane Switching (IPS) mode, Fringe Field Switching (FFS) mode, etc.

If the display panel 300 of the display apparatus according to the embodiment of the present invention is formed of the liquid crystal display panel, a backlight unit 350 is received in the receiving space of the rear cover 100.

The backlight unit 350 may be largely classified into an edge type and a direct type. In case of the edge type, the backlight unit 350 may include a plurality of light sources (not shown) for emitting light to the display panel 300, a light guide plate, at least one diffusion sheet, and at least one optical sheet. Meanwhile, in case of the direct type, the backlight unit 350 may include a plurality of light sources (not shown) for emitting light to the display panel 300, a diffusion plate, at least one diffusion sheet, and at least one optical sheet.

The display panel 300 of the display apparatus according to one embodiment of the present invention may be formed of an organic light-emitting diode (OLED) display panel (not shown). In this case, the OLED display panel may include confronting first and second substrates 302 and 304 bonded to each other. The first substrate 302 includes an organic light-emitting diode device formed in each pixel, and the second substrate 304 is configured to seal the first substrate 302. The first substrate 302 or second substrate 304 of the OLED display panel may further include a color filter corresponding to each pixel. If the display panel 300 of the display apparatus according to the embodiment of the present invention is formed of the OLED display panel, the guide frame 200 may be appropriately changed in its structure. Also, instead of the aforementioned backlight unit 350, the system circuit 360 may be received in the receiving space of the rear cover 100. The system circuit 360 may be a video processing module, a control module, a user interface module, a broadcasting signal receiving module, a speaker module, a broadcasting module, a memory module, and a power source module.

The lower optical film 400 is attached to the rear surface of the first substrate 302 of the display panel 300, wherein the lower optical film 400 may be formed of a lower polarizing film with a first polarizing axis. If the display panel 300 is an OLED display panel, it is possible to omit the lower optical film 400.

The upper optical film 500 is attached to the entire upper surface of the second substrate 304 of the display panel 300, and is also inserted into the optical film insertion groove 122 formed in the cover sidewall 120 of the rear cover 100, wherein the upper optical film 500 may be formed of an upper polarizing film with a second polarizing axis which is different from the first polarizing axis.

The upper optical film 500 may include an attaching portion 510a and an extending portion 510b.

A size of the attaching portion 510a is the same as a size of the second substrate 304, and the attaching portion 510a is attached to the entire upper surface of the second substrate 304.

The extending portion 510b having a predetermined length extends from the attaching portion 510a to the cover sidewall 120a of the rear cover 100, and an end of the extending portion 510b is inserted into and fixed to the optical film insertion groove 122.

In more detail, the extending portion 510b extends from the upper side surface, left side surface, right side surface, left upper corner and right upper corner of the attaching portion 510a so that the extending portion 510b is formed as one body with the attaching portion 510a, wherein the extending portion 510b has a rectangular or U-shaped plane.

A shape in each corner of the extending portion 510b is the same as a shape in each corner formed between each of the cover sidewalls 120. From a front view of the display apparatus, if each corner between the cover sidewalls 120 is rounded, the left upper corner and right upper corner of the extending portion 510b is rounded with a curvature corresponding to a curvature of the corner between the cover sidewalls 120, preferably.

As the extending portion 510b of the upper optical film 500 is inserted into the optical film insertion groove 122 formed in the cover sidewall 120 of the rear cover 100, it is possible to cover a gap space (GS) between the side of the display panel 300 and the cover sidewall 120 of the rear cover 100, thereby preventing foreign matters from permeating into the gap space (GS), and furthermore preventing the aesthetic effects of design from being degraded by the gap space (GS).

In detail, the display panel 300 is connected with the panel connection portion 230 of the guide frame 200 by the use of panel connection member 700, whereby the display panel 300 is received inside the rear cover 100. That is, each side of the display panel 300 is covered by the cover sidewall 120 of the rear cover 100, to thereby prevent each side of the display panel 300 from being exposed to the outside in the side direction of the display apparatus. In this case, an error might occur during a process for manufacturing the display panel 300 and the rear cover 100, whereby the gap space (GS) may be generated between the cover sidewall 120 of the rear cover 100 and the side surface of the display panel 300 received inside the rear cover 100. In this case, according to the present invention, since the rear cover 100 is not formed in the front of the display panel 300, foreign matters may permeate through the gap space (GS), and the aesthetic effects of design in the display apparatus may be degraded due to the gap space (GS).

Accordingly, the extending portion 510b of the upper optical film 500 is inserted into the optical film insertion groove 122 formed in the cover sidewall 120 of the rear cover 100, to thereby cover the gap space (GS). That is, it is possible to prevent the gap space (GS) from being exposed to the front outside of the display apparatus, and furthermore to prevent foreign matters from permeating into the inside of the display apparatus through the gap space (GS).

The panel driver 600 is connected with the plurality of pad regions (PP) prepared on the first substrate 302 of the display panel 300, which generates signals for displaying a predetermined two-dimensional image on the display panel 300 and drives the display panel 300. To this end, the panel driver 600 may include a plurality of flexible circuit films 610, a plurality of data driving integrated circuits 620, and a circuit board 630.

The plurality of flexible circuit films 610 are respectively attached to the pad regions (PP) by Tape Automated Bonding (TAB), wherein each of the flexible circuit films 610 may be Tape Carrier Package (TCP) or Chip On Film (COF). Among the plurality of flexible circuit films 610, the first and/or last flexible circuit film 610 may be provided with gate signal transmission lines for supplying the gate control signal supplied from a controller provided on the circuit board 630 to the gate pad.

Each of the data driving integrated circuits 620, which is provided on the corresponding flexible circuit film 610, coverts digital video data which is input via the circuit board 630 into a data signal, and then supplies the data signal to the corresponding data line through each pad region (PP).

The circuit board 630 is attached to the other side of each flexible circuit film 610 by Tape Automated Bonding (TAB). On the circuit board 630, there is provided a driving circuit (not shown) including the controller (not shown) for controlling driving of the data driving integrated circuit 620 and the gate driving circuit, various power converting circuits (not shown), and memory device (not shown). The driving circuit may be provided on a control board (not shown) connected with the circuit board 630. In this case, the circuit board 630 may be provided with a signal transmission line for transmitting a signal, which is supplied from the driving circuit provided on the control board, to the plurality of flexible circuit films 610, respectively.

The panel connection member 700 is provided to connect the guide frame 200 and the display panel 300 with each other, to thereby prevent the display panel 300 from falling to the front of the display apparatus or being detached from the display apparatus.

In detail, since the cover sidewall 120 of the rear cover 100 is not formed on the upper surface of the display panel 300, that is, the upper surface of the first substrate 302, the display panel 300 may fall down to the front of the display apparatus, or the display panel 300 may be detached from the display apparatus. As the panel connection member 700 is formed between the margin of the lower surface of the display panel 300 and the panel connection portion 230 of the guide frame 200, the display panel 300 is connected with the guide frame 200 so that it is possible to prevent the display panel 300 from falling to the front of the display apparatus or being detached from the display apparatus. In this case, the margin of the lower surface of the display panel 300 may be the margin of the lower surface of the first substrate 302 or the margin of the lower surface of the lower optical film 400. Especially, in order to enhance the above connection between the display panel 300 and the guide frame 200, the upper surface of the panel connection member 700 is connected with the margin of the lower surface of the first substrate 302, preferably. The panel connection member 700 may be double-sided tape, adhesive, photo-curing adhesive or thermal-curing adhesive.

The circuit cover 800 may have an L-shaped cross section to cover the lower long side of the display panel 300 and the panel driver 600. The circuit cover 800 is connected with the cover sidewall 120 positioned at the lower side of the rear cover 100 so that it is possible to prevent the plurality of pad regions (PP) prepared on the first substrate 302 of the display panel 300, the non-display area of the lower long side of the first substrate 302, and the panel driver 600 from being exposed to the front outside of the display apparatus.

In the above display apparatus according to the embodiment of the present invention, the upper optical film 500 attached onto the display panel 300 extends so that the upper optical film 500 is inserted into and fixed to the optical film insertion groove 122 formed in the cover sidewall 120. Accordingly, even though the sealing member disclosed in the related art display apparatus is not used for the display apparatus according to the embodiment of the present invention, it is possible to cover or seal the gap space (GS) occurring between the side of the display panel 300 and the cover sidewall 120 of the rear cover 100 without any damage on the display panel 300.

Figure 5:
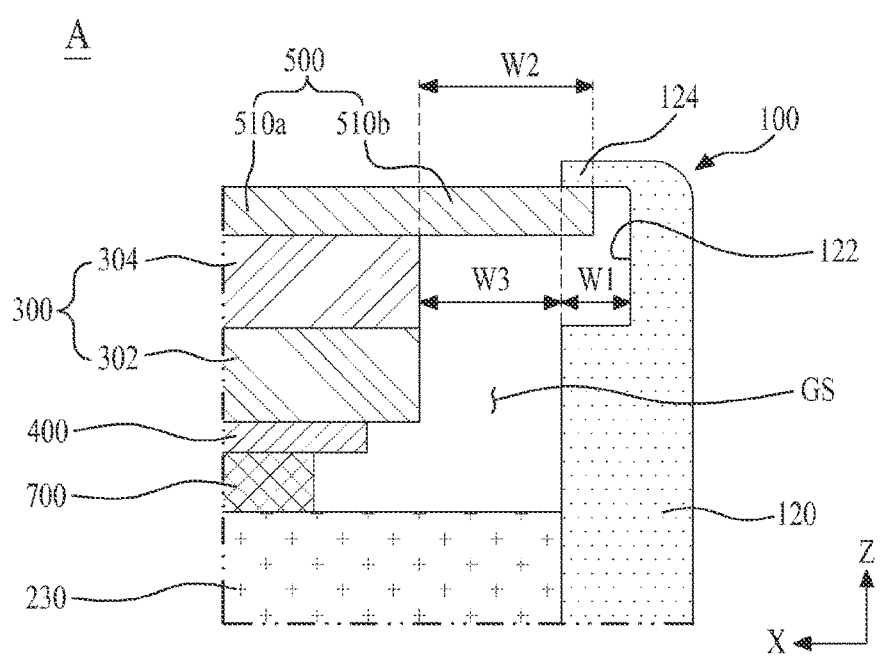
FIG. 5 is an enlarged view illustrating 'A' portion of FIG. 3.
Figure 6:
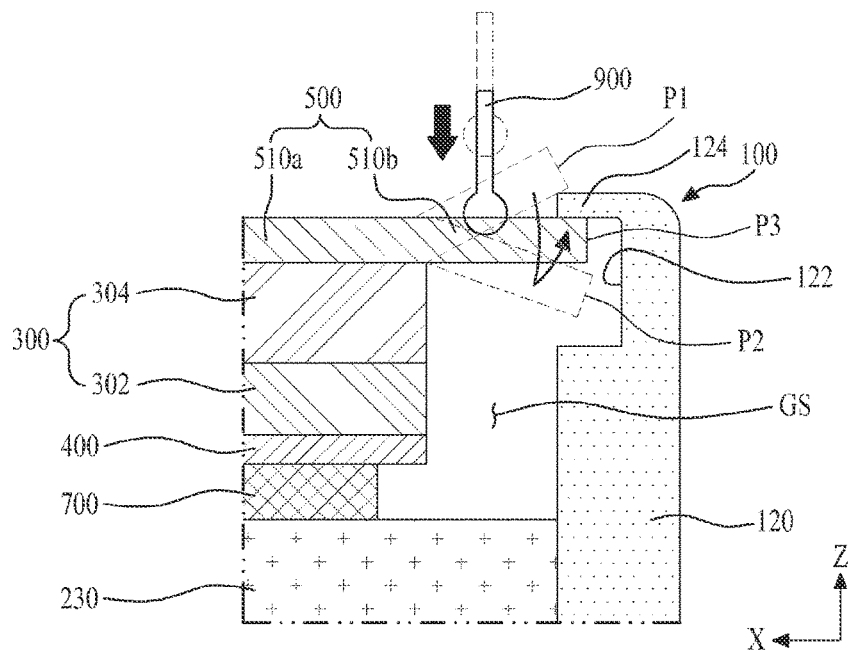
FIG. 6 illustrates a process for fixing an extending portion of the upper optical film, shown in FIG. 5, to a rear cover.

FIG. 5 is an enlarged view of the 'A' portion shown in FIG. 3. FIG. 6 illustrates a process for fixing the extending portion of the upper optical film 500, shown in FIG. 5, to the rear cover 100.

Referring to FIGS. 5 and 6, the optical film insertion groove 122 of the rear cover 100 and the extending portion 510b of the upper optical film 500 will be described in detail as follows.

First, the optical film insertion groove 122 of the rear cover 100 is provided in the inner surface of the cover sidewall 120, and is also positioned at a predetermined offset from the upper surface of the cover sidewall 120 of the rear cover 100. Then, the optical film insertion groove 122 is adjacent to the aforementioned gap space (GS).

In one embodiment, a height of the optical film insertion groove 122 is more than at least twice the thickness of the upper optical film 500 so that the extending portion 510b of the upper optical film 500 is easily inserted into the optical film insertion groove 122.

When the optical film insertion groove 122 is provided in the inner surface of the cover sidewall 120, the optical film insertion groove 122 has a first width (W1) within a range of ¼ to ¾ with respect to the entire width of the cover sidewall 120. If the width (W1) of the optical film insertion groove 122 is not within the above range, the extending portion 510b of the upper optical film 500 may be detached from the optical film insertion groove 122, or the upper portion of the cover sidewall 120 provided with the optical film insertion groove 122 may be bent or cut.

The extending portion 510b of the upper optical film 500 covers the gap space (GS) between the side of the display panel 300 and the cover sidewall 120, and also extends to have a second width (W2) from the attaching portion 510a of the upper optical film 500 so that the extending portion 510b of the upper optical film 500 is inserted into the optical film insertion groove 122. In this case, the second width (W2) of the extending portion 510b is larger than a third width (W3) of the gap space (GS), and is smaller than the total sum (W1+W3) of the first width (W1) and the third width (W3).

A method for fixing the extending portion 510b of the upper optical film 500 to the optical film insertion groove 122 of the rear cover 100 will be described with respect to FIG. 6 as follows.

First, the extending portion 510b of the upper optical film 500 is placed onto the upper surface of the cover sidewall 120 of the rear cover 100 (See "P1" of FIG. 6). That is, under the circumstances that the display panel 300 is connected with the guide frame 200 by the panel connection member 700, the display panel 300 is received in the inside of the rear cover 100. Thus, the extending portion 510b of the upper optical film 500 is bent and placed onto the upper surface of the cover sidewall 120 of the rear cover 100 while being overlapped with the optical film insertion groove 122.

Thereafter, a pushing jig 900 moves downward so that the extending portion 510b of the upper optical film 500 is pushed toward the gap space (GS). Thus, as the extending portion 510b of the upper optical film 500 is forcibly bent, the extending portion 510b of the upper optical film 500 is inserted into the optical film insertion groove 122 adjacent to the gap space (GS) (See "P2" of FIG. 6).

Then, the pushing jig 900 moves upward so that the bent extending portion 510b is inserted into and fixed to the optical film insertion groove 122 (See "P3" of FIG. 6). That is, as the pushing jig 900 moves upward, a pushing force applied to the bent extending portion 510b is released so that the bent extending portion 510b is restored to its original state, that is, horizontal state by an elasticity restoration, whereby the extending portion 510b is inserted into and fixed to the optical film insertion groove 122, to thereby cover and seal the gap space (GS). In this case, an upper stepped portion 124 of the cover sidewall 120, which forms the upper side of the optical film insertion groove 122 with respect to a perpendicular direction (Z), prevents the extending portion 510b from being detached from the optical film insertion groove 122.

Eventually, the extending portion 510b of the upper optical film 500 is inserted into and fixed to the optical film insertion groove 122 by the pushing of the pushing jig 900, thereby facilitating the sealing of the gap space (GS).

Figure 7:
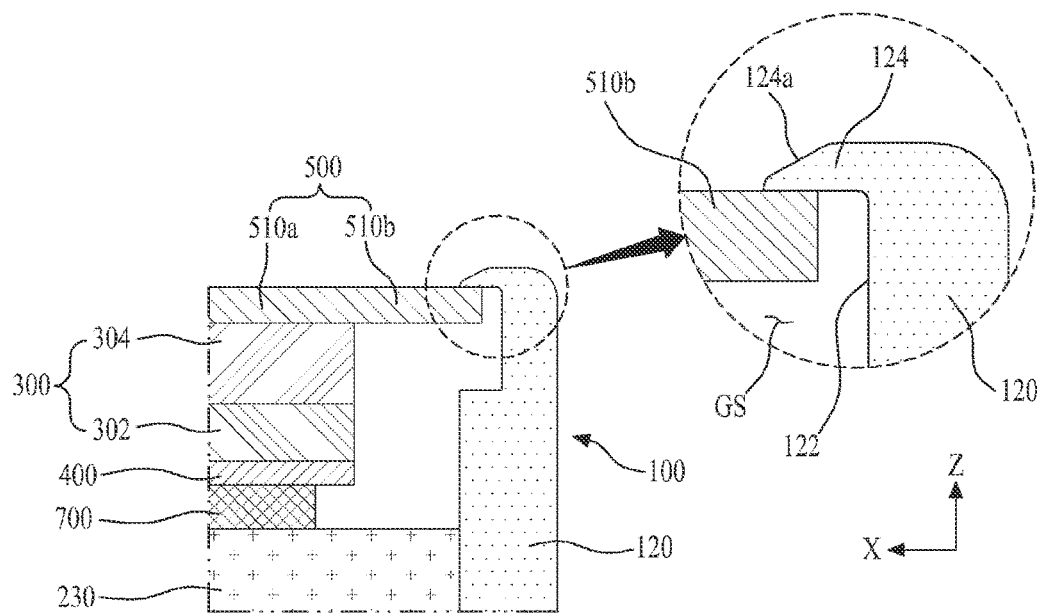
FIG. 7 is an enlarged view illustrating 'A' portion of FIG. 3, which shows one embodiment of the rear cover.
Figure 8:
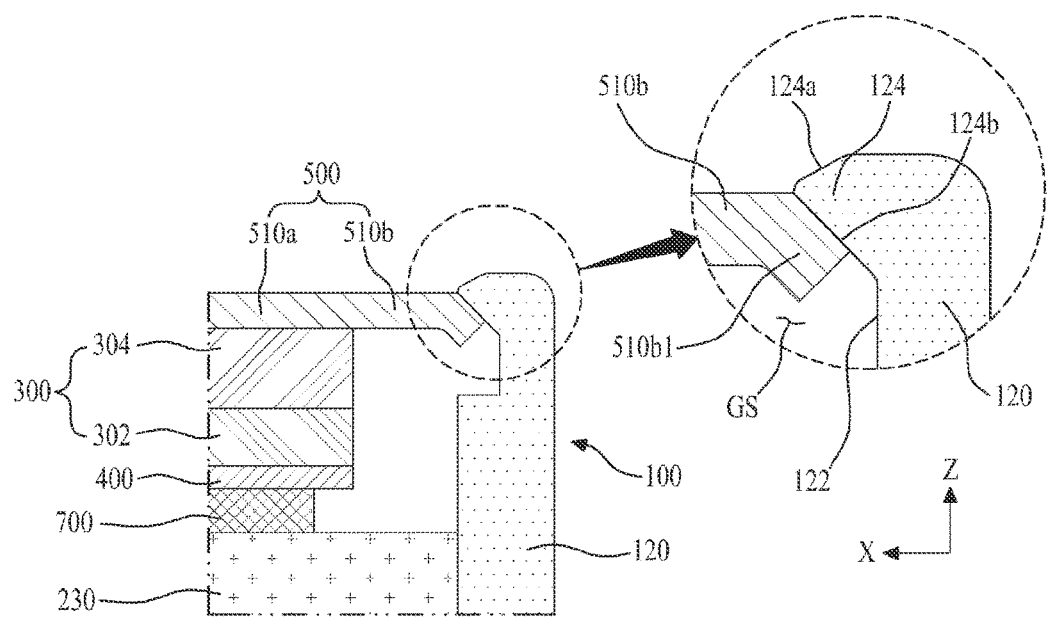
FIG. 8 is an enlarged view illustrating 'A' portion of FIG. 3, which shows a modified embodiment of the rear cover.

FIGS. 7 and 8 are enlarged views illustrating the 'A' portion of FIG. 3, which are provided to describe the alternative embodiments of the rear cover 100.

As shown in FIG. 7, the aforementioned rear cover 100 may further include a pushing guide 124a formed in the upper surface of the aforementioned cover sidewall 120.

The pushing guide 124a with a predetermined inclination is formed on the upper stepped portion 124 of the cover sidewall 120 being overlapped with the extending portion 510b of the upper optical film 500. That is, the pushing guide 124a is provided with the predetermined inclination in the direction from the upper surface of the cover sidewall 120 to the side of the display panel 300. When the extending portion 510b of the upper optical film 500 is pushed toward the gap space (GS) by the pushing jig (See '900' of FIG. 6), the pushing guide 124a reduces resistance against the pushing jig 900 for sliding the extending portion 510b into the optical film insertion groove 122. From the front view of the display apparatus, the pushing guide 124a provides a good exterior appearance of the display apparatus.

As shown in FIG. 8, the aforementioned rear cover 100 may further include a slope 124b in the inner surface of the upper stepped portion 124 of the cover sidewall 120 overlapped with the extending portion 510b of the upper optical film 500.

The slope 124b forms the upper surface of the optical film insertion groove 122 in contact with the upper surface of the extending portion 510b, wherein the slope 124b is provided with a predetermined inclination in the direction from the side surface of the upper stepped portion 124 of the cover sidewall 120 to the inner sidewall of the optical film insertion groove 122. The slope 124b adheres the extending portion 510b of the upper optical film 500, which is inserted into the optical film insertion groove 122, to the optical film insertion groove 122, and prevents the extending portion 510b of the upper optical film 500 from being detached from the optical film insertion groove 122. That is, the extending portion 510b of the upper optical film 500 is bent and pushed to the gap space (GS) by the use of pushing jig (See "900" of FIG. 6) and is then restored to its horizontal state, and is inserted into and fixed to the optical film insertion groove 122. In this case, an end 510b1 of the extending portion 510b is bent in accordance with the inclination of the slope 124b, that is, the bent end 510b1 of the extending portion 510b fixedly adheres to the slope 124b. Accordingly, the slope 124b enables the adherence of the extending portion 510b to the optical film insertion groove 122, thereby preventing foreign matters from permeating into the inside of the display apparatus through the gap between the extending portion 510b and the optical film insertion groove 122.

Figure 9:
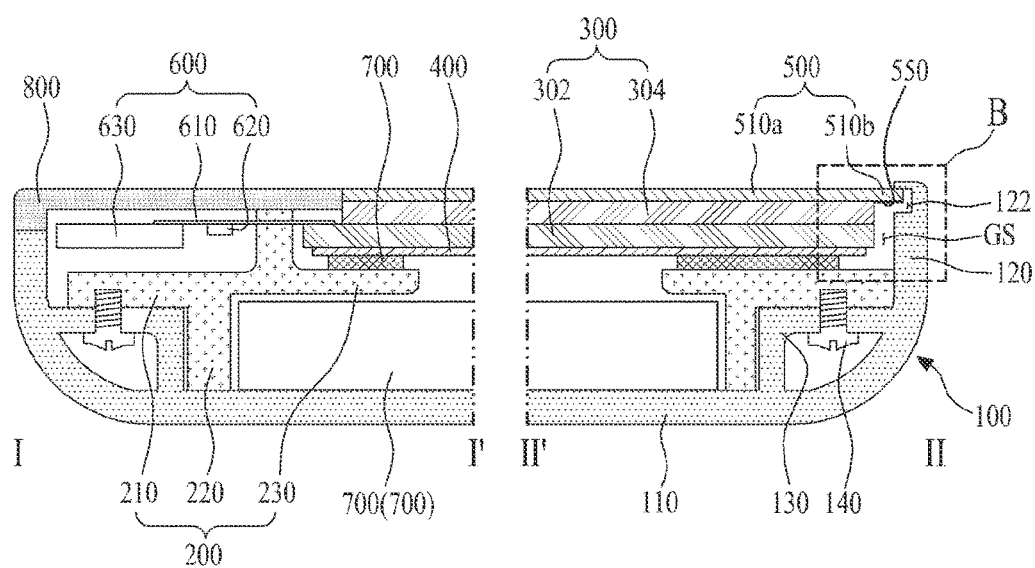
FIG. 9 is a cross sectional view along I-I' and II-II' of FIG. 2, which shows a display apparatus according to a second embodiment of the present invention.
Figure 10:
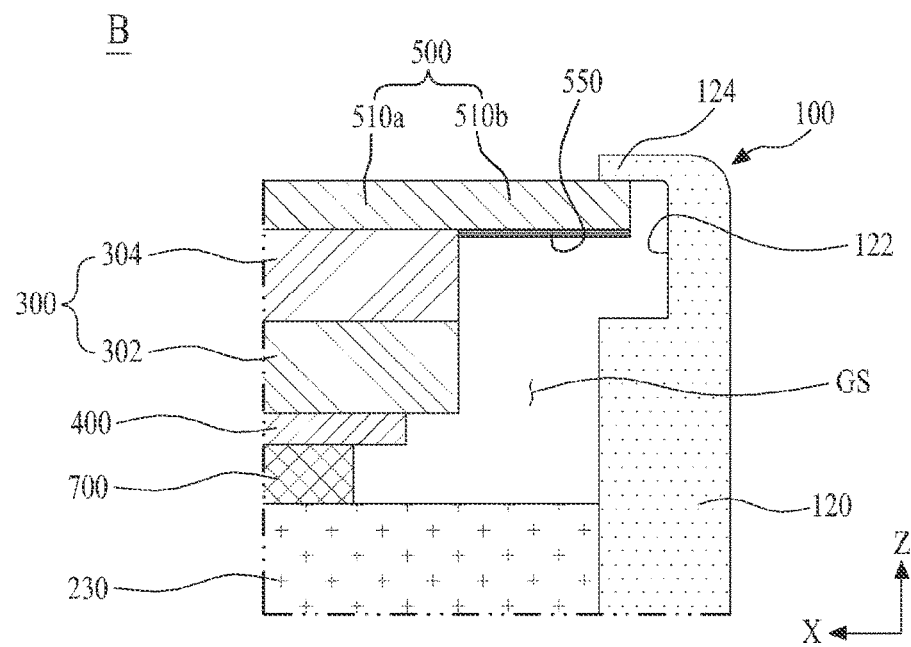
FIG. 10 is an enlarged view illustrating 'B' portion of FIG. 9.

FIG. 9 illustrates a display apparatus according to a second embodiment of the present invention, which is a cross sectional view along I-I' and II-II' of FIG. 2. FIG. 10 is an enlarged view of the 'B' portion shown in FIG. 9, which shows an additionally-provided light-shielding member 550. Hereinafter, only the light-shielding member 550 will be described in detail as follows.

The light-shielding member 550 is formed on a lower surface of an extending portion 510b of an upper optical film 500, to thereby prevent light leakage into sides of a display panel 300. That is, the light-shielding member 550 prevents light from leaking through the sides of the display panel 300, a gap space (GS), and the extending portion 510b of the upper optical film 500 by a total internal reflection occurring in a first substrate 302 of the display panel 300. The light-shielding member 550 may be a light-shielding tape, a light-shielding coating layer of light-shielding resin, or a reflection pattern for reflecting incident light.

Figure 11:
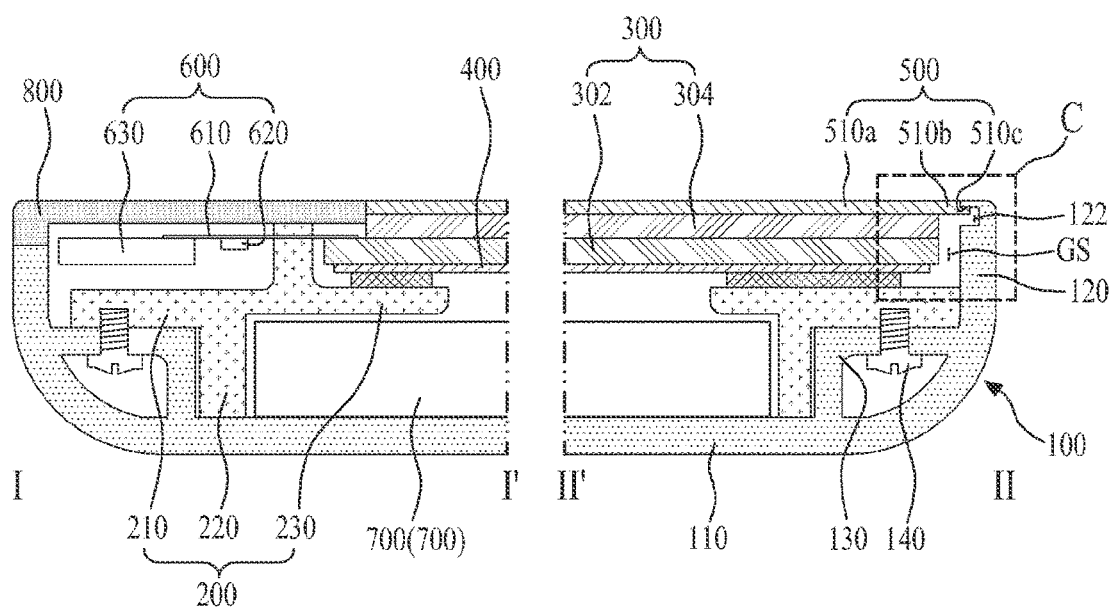
FIG. 11 is a cross sectional view along I-I' and II-II' of FIG. 2, which shows a display apparatus according to a third embodiment of the present invention.
Figure 12:
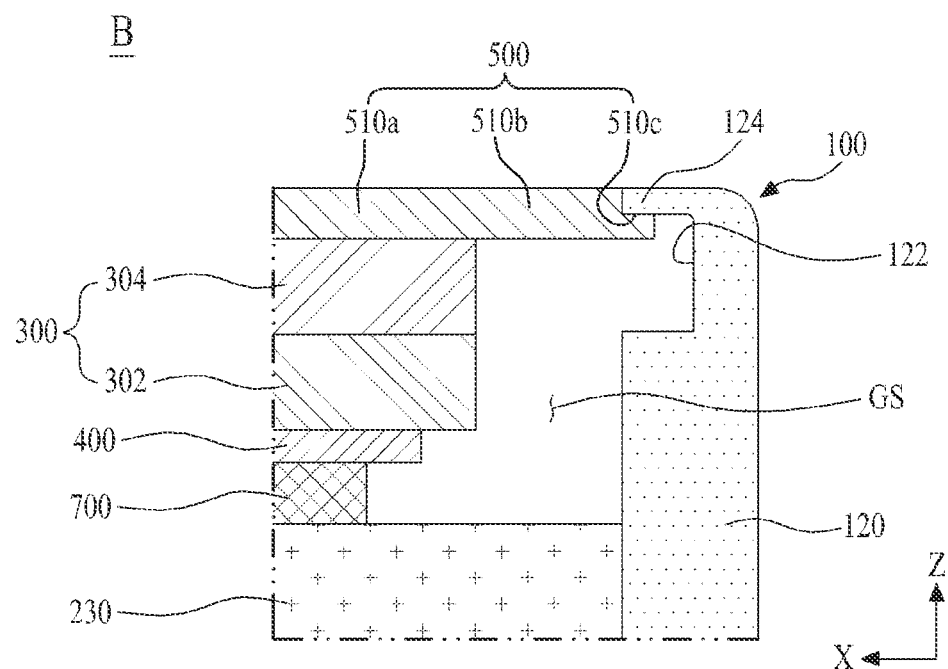
FIG. 12 is an enlarged view illustrating 'C' portion of FIG. 11.
Figure 13:
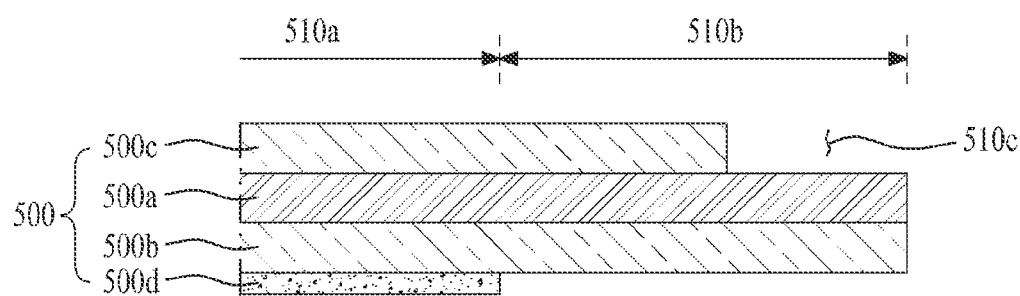
FIG. 13 is a cross sectional view illustrating an upper optical film of FIG. 11.

FIG. 11 illustrates a display apparatus according to a third embodiment of the present invention, which is a cross sectional view along I-I' and II-II' of FIG. 2. FIG. 12 is an enlarged view of the 'C' portion shown in FIG. 11. FIG. 13 is a cross sectional view illustrating an upper optical film shown in FIG. 11, which is obtained by combining structures of the above upper optical film shown in the above embodiments of the present invention. Hereinafter, only the upper optical film will be described in detail as follows.

First, the upper optical film 500 may include a polarizing film 500a, a lower protection film 500b, an upper protection film 500c, and an adhesive layer 500d.

The polarizing film 500a converts non-polarized light vibrating in various directions into polarized light vibrating in only one direction. The polarizing film 500a may be manufactured by dyeing Poly Vinyl Alcohol (PVA) film with dichromatic material ($I_2$, $Cl_2$), and performing an orientation process for a particular direction. Accordingly, the polarizing film 500a absorbs the light vibrating in the same direction as the orientation direction, and polarizes the incident light by transmitting the light vibrating in the direction being perpendicular to the orientation direction.

The lower protection film 500b is attached to the entire lower surface of the polarizing film 500a, to thereby protect the lower surface of the polarizing film 500a. The lower protection film 500b may be formed of Triacetyl Cellulose (TAC) film having a phase difference of zero. The lower protection film 500b may be treated with alkali-saponification. For improving the polarizing properties or endurance, it is preferable that the lower protection film 500a be formed of TAC film. More preferably, the lower protection film 500a is formed of TAC film whose surface is treated by saponification.

The upper protection film 500c is attached to the upper surface of the polarizing film 500a, to thereby protect the upper surface of the polarizing film 500a. The upper protection film 500c may be formed of the same material as that of the lower protection film 500b.

The adhesive layer 500d is formed on the lower surface of the lower protection film 500b, and is attached to an entire upper surface of a second substrate 304 of a display panel 300, whereby the upper optical film 500 is connected with the upper surface of the second substrate 304. In this case, while being overlapped with an attaching portion 510a of the upper optical film 500, the adhesive layer 500d is formed only the lower surface of the lower protection film 500b.

The adhesive layer 500d may be formed of Pressure Sensitive Adhesive (PSA) with good adhesive strength, heat resistance and moisture tolerance. For example, the adhesive layer 500d may include acryl polymer and cross-linker. In this case, the acryl polymer may be, for example, n-butyl acrylate, t-butyl acrylate, 2-ethylhexylacrylate, n-octylacrylate, isononylacrylate, acrylic acid, or metal acrylate. The cross-linker may include two functional groups, wherein the cross-linker may include a monomer containing carboxyl group of acrylic acid, methacrylic acid, maleic acid or itaconic acid, a monomer containing hydroxyl group, acryl amide, methacryl amide, or glycidyl.

As mentioned above, the upper optical film 500 may include the attaching portion 510a and an extending portion 510b. In addition, the upper optical film 500 may further include a stepped portion 510c with a predetermined depth, wherein the stepped portion 510c may be formed in the edge of the extending portion 510b.

The attaching portion 510a and the extending portion 510b are the same as those of the above embodiment of the present invention, whereby a detailed description for the attaching portion 510a and the extending portion 510b will be omitted.

The stepped portion 510c with a predetermined width and depth is formed in the edge of the extending portion 510b, and an upper surface of a cover sidewall 120 of a rear cover 100 is placed onto the stepped portion 510c. In this case, the depth of the stepped portion 510c corresponds to a height of an upper stepped portion 124 of the cover sidewall 120 so as to prevent a height difference between the upper surface of the cover sidewall 120 and the upper surface of the upper optical film 500 (or between the upper surface of the cover sidewall 120 and an upper surface of optical film insertion groove 122). The width of the stepped portion 510c is set within a range of an overlapped portion between the extending portion 510b and the cover sidewall 120, and is also set to be smaller than a width of the overlapped portion between the extending portion 510b and the cover sidewall 120.

As shown in FIG. 13, the extending portion 510b may be formed by removing the upper protection film 500c. Although not shown, the extending portion 510b may alternatively be formed by removing the upper protection film 500c and the polarizing film 500a. According to the height of the upper surface of the cover sidewall 120, the extending portion 510b may be formed by removing only the upper protection film 500c or removing both the upper protection film 500c and the polarizing film 500a, selectively.

In the display apparatus according to the third embodiment of the present invention, the extending portion 510b of the upper optical film 500 is inserted into the optical film insertion groove 122 formed in the cover sidewall 120 of the rear cover 100, and the inner side surface of the upper stepped portion 124 of the cover sidewall 120 is covered by the stepped portion 510c formed in the edge of the extending portion 510b, to thereby remove the height difference between the upper surface of the upper optical film 500 and the cover sidewall 120, and prevent permeation of foreign matters into the gap space (GS). Thus, the upper surface of the upper optical film 500 is positioned at the same height as the upper surface of the cover sidewall 120 of the rear cover 100 in the display apparatus according to the third embodiment of the present invention, thereby providing a good exterior appearance of the display apparatus.

Meanwhile, the display apparatus according to the third embodiment of the present invention may further include a light-shielding member (not shown) on the lower surface of the lower protection film 500b of the extending portion 510b so as to prevent light leakage into the sides of the display panel 300. The light-shielding member may be a light-shielding tape, a light-shielding coating layer of light-shielding resin, or a reflection pattern for reflecting incident light.

Figure 14:
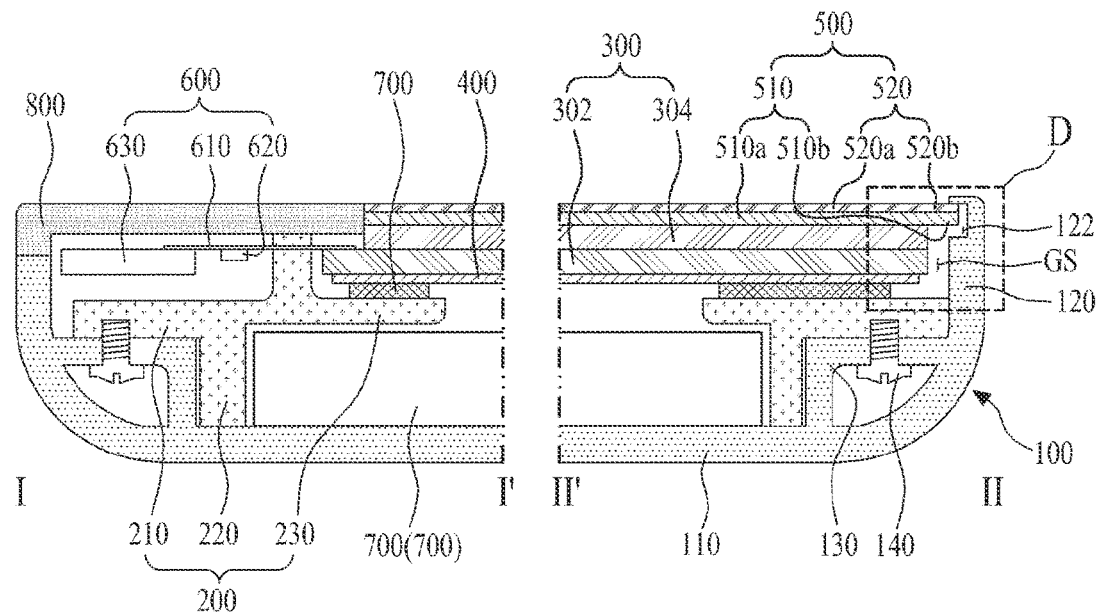
FIG. 14 is a cross sectional view along I-I' and II-II' of FIG. 2, which shows a display apparatus according to a fourth embodiment of the present invention.
Figure 15:
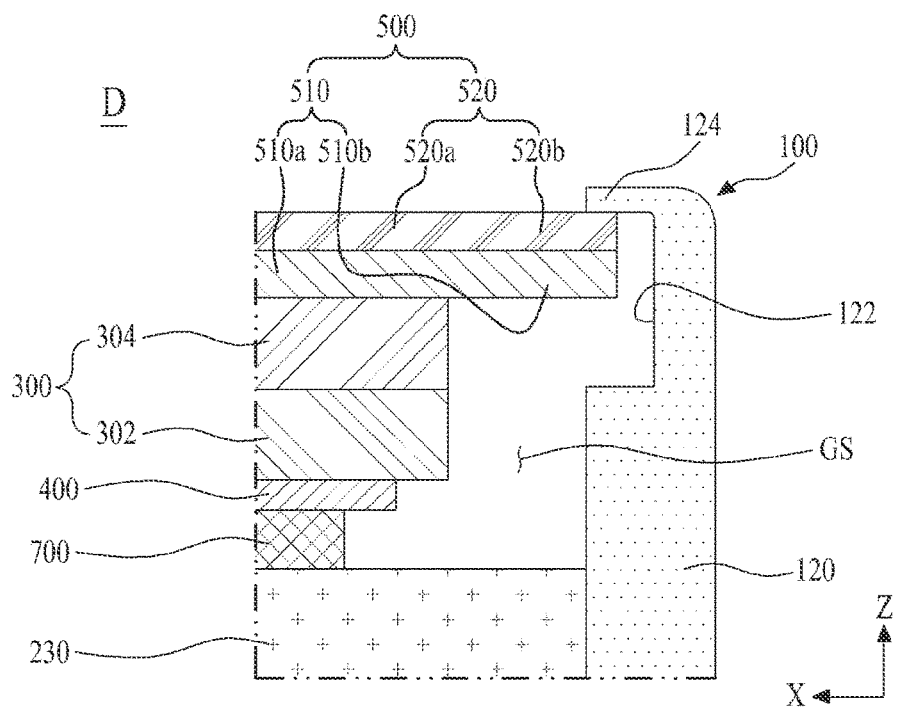
FIG. 15 is an enlarged view illustrating 'D' portion of FIG. 14.

FIG. 14 illustrates a display apparatus according to a fourth embodiment of the present invention, which is a cross sectional view along I-I' and II-II' of FIG. 2. FIG. 15 is an enlarged view illustrating the 'D' portion shown in FIG. 14, which is obtained by combining structures of the above upper optical film shown in the above embodiments of the present invention. Hereinafter, only the upper optical film will be described in detail as follows.

In the display apparatus according to the fourth embodiment of the present invention, a predetermined 2-dimensional image or 3-dimensional image may be displayed on a display panel 300 by a panel driver 600, wherein the 3-dimensional image may include an image seen through the left eye (left-eye image) and an image seen through the right eye (right-eye image). Thus, the display apparatus according to the fourth embodiment of the present invention may be a 3-dimensional image display apparatus.

The upper optical film 500 may include an upper polarizing film 510 and a pattern retarder film 520.

The upper polarizing film 510 may include a first attaching portion 510a attached to an entire upper surface of a second substrate 304 of the display panel 300, and a first extending portion 510b extending from the first attaching portion 510a. In this case, the first attaching portion 510a and the first extending portion 510b are the same as the attaching portion 510a and the first extending portion 510b of the upper optical film included in the display apparatuses according to the first to third embodiments of the present invention, whereby the same reference numbers will be used, and a detailed description for the first attaching portion 510a and the first extending portion 510b will be omitted.

The pattern retarder film 520 separates the left-eye and right-eye images passing through the upper polarizing film 510 from each other so as to make the different polarizing states. To this end, the pattern retarder film 520 may include a plurality of first retarder patterns (not shown) for converting the left-eye image to the first polarizing state, and a plurality of second retarder patterns (not shown) for converting the right-eye image to the second polarizing state, wherein each second retarder pattern is positioned between each of the first retarder patterns. The pattern retarder film 520 may include a second attaching portion 520a whose size is the same as a size of the first attaching portion 510a of the upper polarizing film 510, and a second extending portion 520b whose size is the same as a size of the first extending portion 510b of the upper polarizing film 510, wherein the second attaching portion 520a is attached to the upper surface of the first attaching portion 510a, and the second extending portion 520b is attached to the upper surface of the first extending portion 510b.

The second extending portion 520b together with the first extending portion 510b of the upper polarizing film 510 is inserted into and fixed to an optical film insertion groove 122 formed in a cover sidewall 120 of a rear cover 100, to thereby cover and seal a gap space (GS) between the display panel 300 and the cover sidewall 120.

Meanwhile, the second extending portion 520b of the pattern retarder film 520 may have a width corresponding to a width of the gap space (GS) so as to prevent the second extending portion 520b from being inserted into the optical film insertion groove 122. That is, the second extending portion 520b may have a width which is smaller than the first extending portion 510b by a width corresponding to an overlapped portion between the first extending portion 510b of the upper polarizing film 510 and the cover sidewall 120. Accordingly, while only the first extending portion 510b of the upper polarizing film 510 is inserted into the optical film insertion groove 122, the second extending portion 520b of the pattern retarder film 520 is positioned at the side of the upper surface of the cover sidewall 120 provided on the first extending portion 510b of the upper polarizing film 510. Thus, without a height difference between the upper surface of the upper optical film 500 and the cover sidewall 120, the upper surface of the upper optical film 500 is positioned in the same plane as the upper surface of the cover sidewall 120 of the rear cover 100.

The upper optical film 500 may further include a reflection prevention film (not shown).

The reflection prevention film may include a minute uneven structure. According as the reflection prevention film is attached to the entire upper surface of the pattern retarder film 520, it is possible to prevent the external light from being reflected on the surface of the pattern retarder film 520. The reflection prevention film together with the first extending portion 510b of the upper polarizing film 510 and the second extending portion 520b of the pattern retarder film 520 is inserted into and fixed to the optical film insertion groove 122 formed in the cover sidewall 120 of the rear cover 100, to thereby cover and seal the gap space (GS) between the display panel 300 and the cover sidewall 120.

Figure 16:
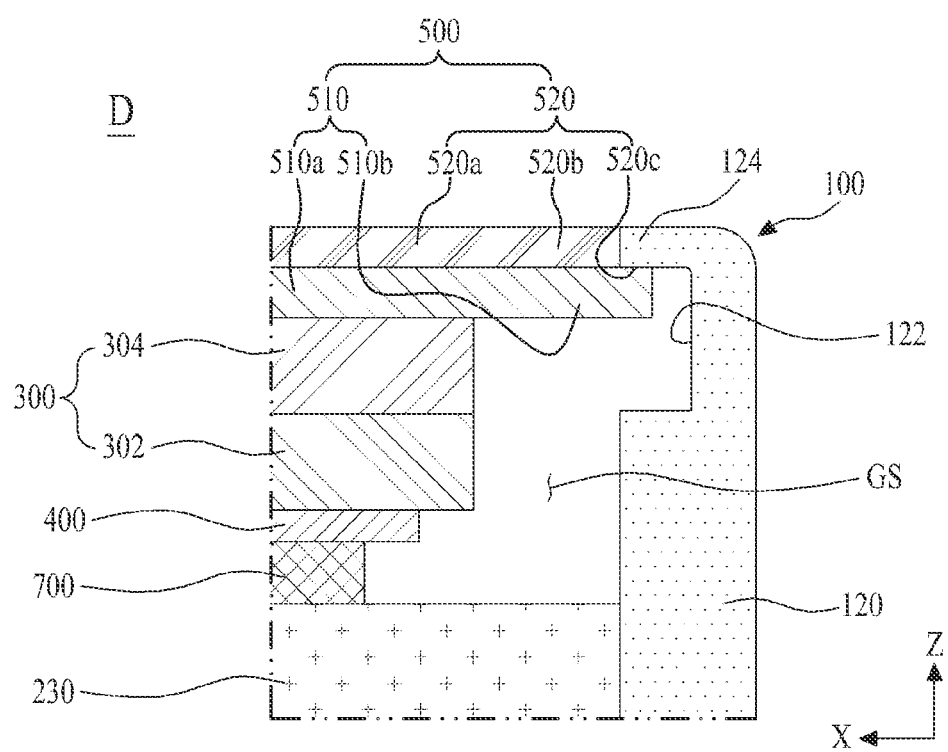
FIG. 16 is an enlarged views illustrating 'D' portion of FIG. 14, which shows a modified embodiment of a pattern retarder film shown in FIGS. 14 and 15.

In another embodiment, the reflection prevention film may have the same size as the pattern retarder film 520 shown in FIG. 16 and is not inserted into the optical film insertion groove 122. In this case, the edge of the reflection prevention film overlapped with the second extending portion 520b of the pattern retarder film 520 is positioned at the side of the upper surface of the cover sidewall 120 provided on the first extending portion 510b or second extending portion 520b, whereby the upper surface of the upper optical film 500 is positioned in the same plane as the upper surface of the cover sidewall 120 of the rear cover 100.

Meanwhile, the display apparatus according to the fourth embodiment of the present invention may further include a light-shielding member (not shown) on the lower surface of an extending portion 510b of the upper polarizing film 510 so as to prevent light leakage into the sides of the display panel 300. The light-shielding member may be a light-shielding tape, a light-shielding coating layer of light-shielding resin, or a reflection pattern for reflecting incident light.

According to the present invention, the upper optical film 500 attached to the upper surface of the display panel 300 extends so that the extending portion 510b of the upper optical film 500 is inserted into and fixed to the optical film insertion groove 122 formed in the inner surface of the cover sidewall 120 of the rear cover 100, to thereby cover and seal the gap space (GS) between the side of the display panel 300 and the cover sidewall 120 of the rear cover 100 without any damage on the display panel 300.

Also, the upper surface of the upper optical film 500 is positioned in the same plane as the upper surface of the cover sidewall 120 of the rear cover 100 to provide a good exterior appearance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
   a single body rear cover that covers a rear portion of the display apparatus, the single body rear cover with a receiving space prepared by a cover plate and a cover sidewall that is included in the single body rear cover, wherein the cover sidewall included in the single body rear cover comprises a first portion and a second portion integrated with the first portion in a single body, the first portion extending vertically from the cover plate and the second portion extending horizontally from an end of the first portion towards the receiving space, and wherein an optical film insertion groove is formed in an inner side of the first portion facing the receiving space and is adjacent to the second portion;
   a guide frame received in the receiving space;
   a display panel supported by the guide frame;
   a panel connection member for connecting the display panel with the guide frame; and
   an upper optical film attached to an upper surface of the display panel,
   wherein the first portion of the cover sidewall covers side surfaces of the display panel and the upper optical film, and
   an end of the upper optical film is inserted into the optical film insertion groove, the second portion of the cover sidewall covering and sealing a gap space between the display panel and the first portion of the cover sidewall when the end of the upper optical film is inserted into the optical film insertion groove,
   wherein an upper surface of the upper optical film is positioned below the second portion of the cover sidewall and the end of the upper optical film is in contact with an upper surface of the optical film insertion groove and is not in contact with a lower surface of the optical film insertion groove.

2. The display apparatus of claim 1, wherein the upper optical film includes:
   an attaching portion attached to the upper surface of the display panel; and
   an extending portion extending from the attaching portion and inserted into the optical film insertion groove.

3. The display apparatus of claim 2, wherein the single body rear cover further includes a pushing guide provided with a predetermined inclination in order to guide the extending portion to be inserted into the optical film insertion groove, wherein the pushing guide is formed on an upper surface of the second portion of the cover sidewall.

4. The display apparatus of claim 2, wherein the single body rear cover further includes a slope provided with a predetermined inclination on an upper surface of the optical film insertion groove in contact with the extending portion of the upper optical film.

5. The display apparatus of claim 4, wherein the extending portion of the upper optical film inserted into the optical film insertion groove is bent in accordance with the inclination of the slope and adhered to the slope.

6. The display apparatus of claim 1, wherein a height of the optical film insertion groove larger than twice the thickness of the upper optical film.

7. A display apparatus comprising:
a single body rear cover that covers a rear portion of the display apparatus, the single body rear cover with a receiving space prepared by a cover plate and a cover sidewall that is included in the single body rear cover, wherein the cover sidewall included in the single body rear cover comprises a first portion and a second portion integrated with the first portion in a single body, the first portion extending vertically from the cover plate and the second portion extending horizontally from an end of the first portion towards the receiving space, and wherein an optical film insertion groove is formed in an inner side of the first portion facing the receiving space and is adjacent to the second portion;
a guide frame received in the receiving space;
a display panel supported by the guide frame;
a panel connection member for connecting the display panel with the guide frame; and
an upper optical film attached to an upper surface of the display panel,
wherein the first portion of the cover sidewall covers side surfaces of the display panel and the upper optical film, and
an end of the upper optical film is inserted into the optical film insertion groove, the second portion of the cover sidewall covering and sealing a gap space between the display panel and the first portion of the cover sidewall when the end of the upper optical film is inserted into the optical film insertion groove,
wherein an upper surface of the end of the upper optical film is in contact with an upper surface of the optical film insertion groove and is not in contact with a lower surface of the optical film insertion groove.

8. The display apparatus of claim 7, wherein the upper optical film includes:
an attaching portion attached to the upper surface of the display panel; and
an extending portion extending from the attaching portion and inserted into the optical film insertion groove.

9. The display apparatus of claim 8, wherein the single body rear cover further includes a pushing guide provided with a predetermined inclination in order to guide the extending portion to be inserted into the optical film insertion groove, wherein the pushing guide is formed on an upper surface of the cover sidewall overlapped with the extending portion of the upper optical film.

10. The display apparatus of claim 8, wherein the single body rear cover further includes a slope provided with a predetermined inclination on an upper surface of the optical film insertion groove in contact with the extending portion of the upper optical film.

11. The display apparatus of claim 10, wherein the extending portion of the upper optical film inserted into the optical film insertion groove is bent in accordance with the inclination of the slope and adhered to the slope.

12. A display apparatus comprising:
a single body rear cover that covers a rear portion of the display apparatus with a receiving space created by a cover plate and a cover sidewall, wherein the cover sidewall comprises a first portion and a second portion integrated with the first portion as a single body, the first portion extending from the cover plate and the second portion extending from an end of the first portion towards the receiving space, and wherein an optical film insertion groove is at in an inner side of the first portion facing the receiving space and is adjacent to the second portion;
a guide frame received in the receiving space;
a display panel supported by the guide frame;
a panel connection member for connecting the display panel with the guide frame; and
an upper optical film attached to an upper surface of the display panel,
wherein the cover sidewall covers side surfaces of the display panel and an end of the upper optical film and a thickness of the upper optical film is smaller than a height of the optical film insertion groove and the end of the upper optical film is inserted into the optical film insertion groove so as to cover and seal a gap space (GS) between the display panel and the cover sidewall, thereby preventing the gap space (GS) from being exposed to the front outside of the display apparatus and preventing foreign matters from entering into the display apparatus through the gap space (GS).

13. The display apparatus of claim 12, wherein the upper optical film includes:
an attaching portion attached to the upper surface of the display panel; and
an extending portion extending from the attaching portion and inserted into the optical film insertion groove.

14. The display apparatus of claim 13, wherein the optical film insertion groove has a first width (W1) within a range of ¼ to ¾ with respect to the entire width of the cover sidewall.

15. The display apparatus of claim 14, wherein the extending portion of the upper optical film has a second width (W2) and the second width (W2) is larger than a third width (W3) of the gap space and smaller than the total sum (W1+W3) of the first width (W1) and the third width (W3).

16. The display apparatus of claim 12, wherein the upper surface of the end of the upper optical film is in contact with an upper surface of the optical film insertion groove and is not in contact with a lower surface of the optical film insertion groove.

17. The display apparatus of claim 12, wherein the single body rear cover further includes a pushing guide provided with a predetermined inclination in order to guide the extending portion to be inserted into the optical film insertion groove, wherein the pushing guide is formed on an upper surface of the second portion of the cover sidewall.

18. The display apparatus of claim 12, wherein the single body rear cover further includes a slope provided with a predetermined inclination on an upper surface of the optical film insertion groove in contact with the extending portion of the upper optical film.

19. The display apparatus of claim 18, wherein the extending portion of the upper optical film inserted into the optical film insertion groove is bent in accordance with the inclination of the slope and adhered to the slope.

20. An apparatus comprising:
a single body rear cover that covers a rear portion of the display apparatus with a receiving space created by a cover plate and a cover sidewall, wherein the cover sidewall comprises a first portion and a second portion integrated with the first portion as a single body, the first portion extending from the cover plate and the second portion extending from an end of the first portion towards the receiving space, and a gap space is generated between the single body rear cover and a side surface of the display received inside the single body rear cover, wherein an optical film insertion groove is at in an inner side of the first portion facing the receiving space and is adjacent to the second portion;

a guide frame received in the receiving space;

a display panel supported by the guide frame; and a panel connection member for connecting the display panel with the guide frame;

an upper optical film attached to an upper surface of the display panel and inserted into the optical film insertion groove;

wherein the optical film insertion groove has a first width within a range of ¼ to ¾ with respect to an entire width of the cover sidewall;

wherein an extending portion of the upper optical film has a second width and the second width is larger than a third width of the gap space and smaller than the total sum of the first width and the third width.

21. The apparatus of claim 20, wherein the upper optical film is elastically biased at the optical film insertion groove that has a specific structure and clearance to accommodate flexibility of the upper optical film during its-attachment or removal.

22. The apparatus of claim 20, wherein the specific structure includes an inclined surface on at least one among an outer side of the optical film insertion groove and an inner edge of the optical film insertion groove.

* * * * *